United States Patent
Geyer

[11] Patent Number: 5,217,303
[45] Date of Patent: Jun. 8, 1993

[54] MILLSTONE EXTRUSION APPARATUS

[76] Inventor: Paul Geyer, 210 B. N. Lindell, Greensboro, N.C. 27403

[21] Appl. No.: 907,681

[22] Filed: Jul. 2, 1992

Related U.S. Application Data

[63] Continuation-in-part of Ser. No. 631,332, Dec. 20, 1990, Pat. No. 5,129,729.

[51] Int. Cl.$^5$ .............................................. B29B 1/06
[52] U.S. Cl. ....................................... 366/88; 366/89; 366/90
[58] Field of Search ................... 366/79, 80, 81, 78, 366/82, 83, 84, 85, 87, 88, 89, 90, 322, 323, 327; 425/207, 208

[56] References Cited

U.S. PATENT DOCUMENTS

| | | | |
|---|---|---|---|
| 4,155,655 | 5/1979 | Chiselko | 366/89 |
| 4,640,672 | 2/1987 | Ellwood | 366/79 |
| 4,652,138 | 3/1987 | Inoue | 366/90 |
| 4,872,761 | 10/1989 | Geyer | 366/79 |

Primary Examiner—Robert W. Jenkins
Attorney, Agent, or Firm—Dykema Gossett

[57] ABSTRACT

An extrusion apparatus is provided for the mixing and extrusion of thermo-plastic and thermo-setting materials and the pelletizing of thermo-set materials, in which a rotor member is rotatable within a barrel member. The apparatus is articulated into three sections including a barrel entrance section, a forcing section and a metering section. Each section is provided with helical rotor extrusion grooves, and is followed by a circumferential barrier and a rotor to barrel to rotor mixing zone. The circumferential barrier is provided with a clearance, barrier top to barrel bore, designed to pass fluent material and retarding the over-size and less fluent material. The leading edge of the circumferential barrier is provided with multiple dual purpose plows which, direct the fluent material downstream and the over-size and less fluent material upstream for additional working. The circumferential barrier communicates with the co-acting receiving geometry of the barrel and effects the transfer of the fluent material to the barrel grooves. The barrel grooves co-acting with the smooth surface of the rotor are arranged to have various extrusion rates so as to displace the material longitudinally and thereby achieve longitudinal blending. The barrel extrusion grooves discharge into the barrel sending grooves which transfer the material from the barrel back into the rotor receiving geometry.

18 Claims, 3 Drawing Sheets

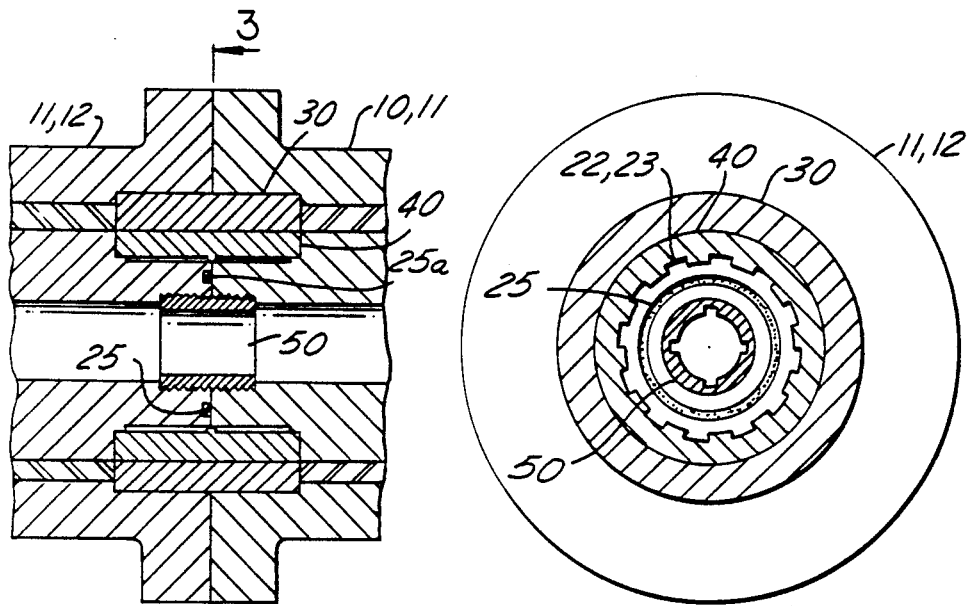
FIG.2
FIG.3
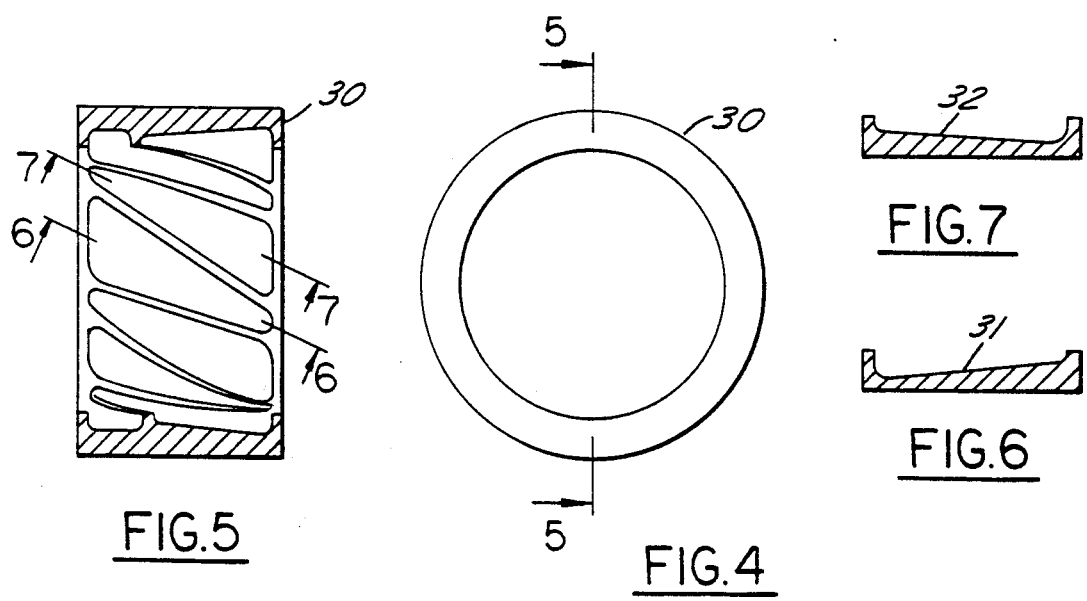
FIG.5
FIG.4
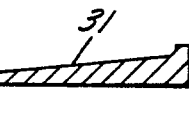
FIG.7
FIG.6

MILLSTONE EXTRUSION APPARATUS

RELATED APPLICATION

This patent application is a continuation-in-part U.S. patent application of my co-pending application Ser. No. 07/631,332, filed Dec. 20, 1990, now U.S. Pat. No. 5,129,729.

BACKGROUND OF THE INVENTION

1. Field of the Invention

This invention relates to mixing and extruding of thermo-plastic and thermo-setting materials and to pelletizing thermo-set materials. More particularly, this invention concerns a screw or worm type apparatus or millstone extruder for the mixing and extruding of varied viscosity, natural and synthetic rubber and elastomeric material. Also the apparatus can be adapted for grinding thermo-set materials (scrap tires) into rubber pellets. Unless otherwise indicated the terms "extruder" and "extrusion apparatus" used herein, refer to and include a screw or worm type apparatus used to obtain an extrudate of desired cross-sectional configuration, and or for the mixing, blending, milling of thermo-plastic or thermo-setting compounds. The extrusion apparatus can also be used to grind thermo-set materials to pellets for reprocessing or to reclaim rubber.

2. Description of Prior Art

The now conventional transfer type extruders, includes a barrel, a screw type rotor within the barrel which is adapted for rotational movement relative to the barrel and a means of introducing the material to be processed into the extruder, such as a hopper and its associated apparatus, if any. The rotor is provided with various threaded configurations and rotational movement forces the material through the barrel and out of the down stream end of the extruder. Interposed between the hopper and discharge end are multiple rotor to barrel to rotor stock transfers which cross blend the process material passing from rotor to barrel to rotor. Thus, while the process material is being discharged from the extruder, hot or cold unprocessed material is fed into the feed hopper at the opposite end of the extruder to provide a continuous extrusion process.

Examples of the prior art are my U.S. patents including U.S. Pat. No. 2,744,287 dated May 8, 1956; U.S. Pat. No. 3,375,549 dated Feb. 2, 1968; U.S. Pat. No. 4,075,712 dated Feb. 21, 1978; U.S. Pat. No. 4,872,761 dated Oct. 10, 1989; and U.S. Pat. No. 4,944,597 dated Jul. 21, 1990.

Although many problems relative to the extrusion of plastic materials have been solved temperature stratification, longitudinal blending, adaptability to a wide range of compounds and temperature control are continuing problems.

SUMMARY OF THE INVENTION

The novel extruder solves certain problems known in the art by improving or providing: (1) warming and mixing of the material; (2) temperature control; and (3) economy of operation.

1. WARMING AND MIXING:

Material flow in helical extrusion grooves is generated by material adhering to the barrel bore, thereby causing the material to flow from the leading edge to the trailing edge of the helical extrusion groove. This results in a process which tends to elongate the material at the outer portion of the groove. The elongated material, reaching the trailing edge of the groove, must "push" its way down and back across the bottom of the groove to make the process continuous. This "pushing action" compresses the elongated material and thereby relaxes the developed strain, wasting the power used to elongate the material. Continued extruder action develops the material in the extruder groove into a band of warmed material surrounding a core of cold material, or temperature stratification. Continued extruder action then works and reworks the warmed material to produce an extrusion of over-mixed and under-mixed material.

This action has been improved by rotor to barrel to rotor cross blending of the transfer mix but as the extruder operates on the first in, first out basis longitudinal blending is relatively nonexistent.

The extruder of the present invention has improved extrusion mixing and is capable of processing a wide range of compounds.

The extruder has entrance, forcing and metering sections. B barrel rings comprising the mixing zone. By changing rings the extruder processing capability can be easily altered to suit the required parameters of the process material, or newly developed process material.

Each section is provided with helical extruder grooves of decreasing extrusion capacity so that pressure development is progressively increased in the downstream direction. The helical grooves are provided with a tapered bottom, deep at the leading edge and shallow at the trailing edge. This design, when viewed in cross-section, is a tightening spiral that "pinches" the process material in the extrusion groove as it flows from the leading edge to the trailing edge. The degree of taper is adjusted to suit the material being processed.

The mixing zones start with a circumferential barrier, the entrance of which has the clearance barrier top to barrel bore arranged to "skim" off the outer layer of material entering the transfer zone. To develop longitudinal displacement of the process material, the leading edge of the barrier is provided with dual purpose plows. The plows are arranged to direct the fluent outer material downstream to the circumferential rotor extrusion groove or grooves and the less fluent lower material back upstream so as to expose the material to additional extruder action. The circumferential rotor extrusion groove tapers in depth so as to force the process material to be transferred into the barrel receiving zone. Barrel extrusion grooves of the barrel receiving zone are provided with unequal extrusion capacity, so that the process material is displaced longitudinally in relation to itself.

Material leaving the barrel extrusion grooves re-enters the rotor through multiple rotor plows which cut and re-cut the entering material.

2. TEMPERATURE CONTROL:

The work input to thermo-setting materials is limited by the vulcanizing temperature. Work input in excess of the work required to warm the material must be disadapted by machine cooling. Cooling rubber, due to poor heat conductivity, is difficult and expensive. The Present extruder, due to ideal mixing procedure at each section, can uniformly warm the material, prepare it for extrusion, with the only cooling required is the process material itself. This arrangement is adiabatic extrusion and features extruder rotor speeds technically infinite.

The novel extruder requires a short extruder which, unfortunately, will not warm soft materials. For soft stocks, replacement of mixing zones or entire sections can add to the work required to warm the material while adding to the quality of the material. Throttling the extrusion flow will also raise the extrusion temperature, but the added work may take place in a non-critical area and thereby, in effect, waste power.

3. ECONOMY OF OPERATION:

The novel extruder can be adapted to all present materials and many materials to be developed. The short design (one third the length of a pin type extruder) will require significantly less material, the power input and gear box can be approximately one half that of Present day extruders and most of all, high speed operation can produce the extrusion with at least one size smaller extruder. The short sections can be cast steel eliminating expensive machining.

FEATURES OF THE PRESENT INVENTION

It is therefore a feature of the present invention to provide an extruder which can be adapted to process all present day compounds and can be arranged to process compounds to be developed.

Another feature of the present invention is to provide an extruder which reduces the rework of already worked material and thereby produces an extrusion of uniformity worked material and not a blend of over-worked and under-worked material.

Still another feature of the present invention is to correct extruder groove temperature stratification by material transfer through the shear area, rotor outside diameter to barrel inside diameter.

A further feature of the present invention is to provide a circumferential barrier at the rotor to barrel transfer to retard the oversize and less fluent material and thereby subject it to additional work.

A still further feature of the present invention is to provide dual purpose plows on the leading edge of the circumferential barriers, which direct the outer groove warmed material downstream to the barrier, and which direct the inner groove cooler material upstream exposing it to additional extruder action, and to separate the material longitudinally and thereby make longitudinal blending possible.

Another feature of the present invention is to provide rotor to barrel to rotor transfers to the barrel grooves which are of different extrusion capacities so that the process material is displaced longitudinally to assist in longitudinal blending.

Still another feature of the present invention is to provide an extruder with extruder geometry suited to the processing, stage by stage, that prepares the material for extrusion, using input power only equal to the work required to warm the process material.

A further feature of the present invention is to provide an extruder which can be adjusted to process all compounds to a set extrusion temperature and to hold that set temperature throughout the full speed range of the extruder.

The final feature of the present invention is to provide an extruder which due to its short length and high speed operation, will cost less than half the cost of present day equipment per unit of production, will produce a superior quality material and be adaptable to process polymers up to and including sections of scrap tires.

DESCRIPTION OF THE DRAWINGS

FIG. 2 is an enlarged view of part of the extruder of FIG. 1 and showing the splicing arrangement between a pair of adjacent sections;

FIG. 3 is a view taken on the line 3—3 of FIG. 2;

FIG. 4 is an end view of the barrel member of the rotor to barrel to rotor zone;

FIG. 5 is a sectional view taken on line 5—5 of FIG. 4 and illustrating the unequal barrel extrusion grooves;

FIG. 6 is a sectional view taken on line 6—6 of FIG. 5 and showing one of the unequal barrel extrusion groove;

FIG. 7 is a sectional view taken on the line 7—7 of FIG. 5 and showing another unequal barrel extrusion groove;

DETAILED DESCRIPTION OF THE PREFERRED EMBODIMENT

Figure 1:
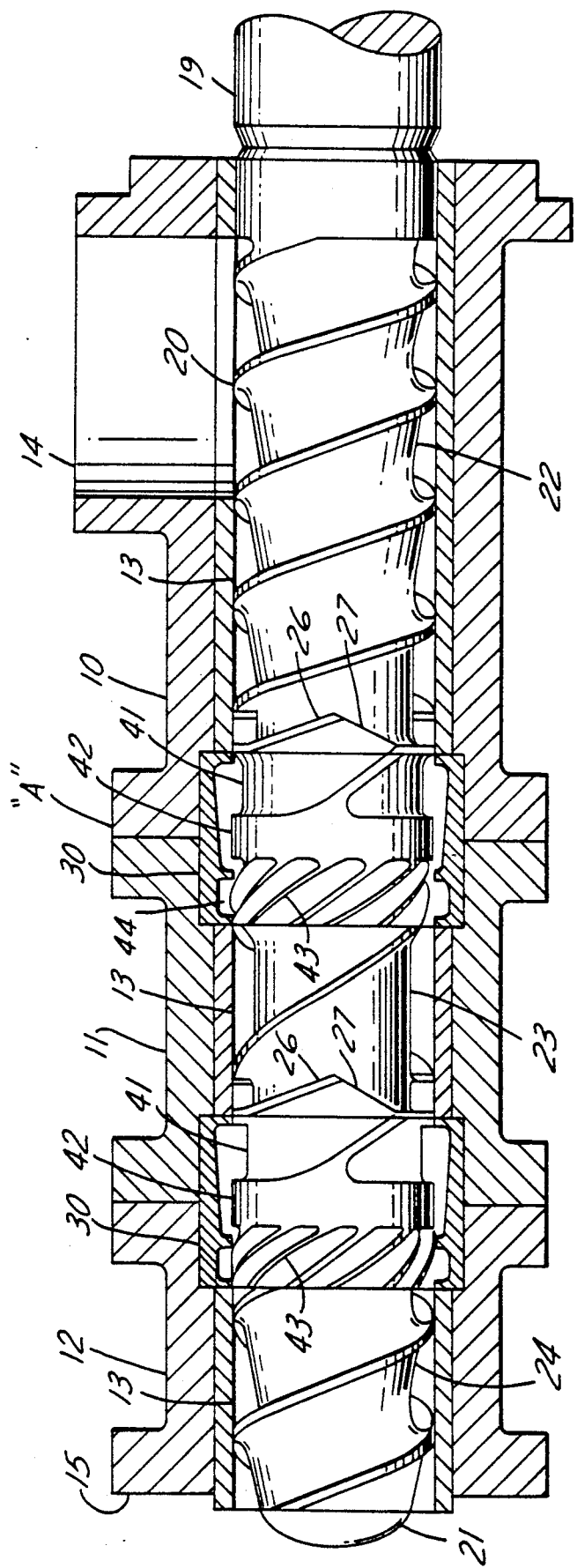
FIG. 1 is a longitudinal view of the extruder or extrusion apparatus, partly in section.
Figure 9:
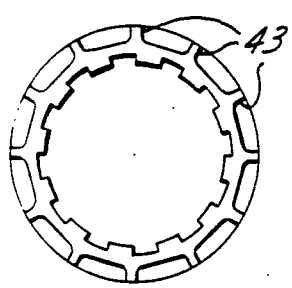
FIG. 9 is an end view of the rotor shown in FIG. 8 and illustrating the downstream rotor receiving grooves.

Referring to the drawings, extrusion apparatus "A" illustrated in FIG. 1 is designed for the processing of natural and synthetic rubber-like materials, hot or cold fed and also many thermo-plastic materials. The extrusion apparatus "A" has barrel members 10, 11 and 12, each provided with a bore 13 extending therethrough, which acts in combination with rotor or rotor member 20. The rotor 20 is rotatably mounted in barrel members 10, 11 and 12. The rotor 20 is adapted to be rotated by drive means 19, as is conventional in the art. Barrel member 10 forms the barrel entrance section; barrel member 11 forms the forcing section; and barrel member 12 forms the metering sections.

The barrel 10 is provided at the feed end thereof with a hopper opening or barrel entrance opening 14 in the top thereof, or in the side thereof and remote from the discharge end 15.

At the upstream end of the extrusion apparatus A, adjacent the hopper and barrel entrance 14, the rotor 20 is provided with a single start helical extrusion groove 22, which has a lead approximately equal to the diameter of the rotor 20. The rotor helical extrusion groove 22 when filled with process material from hopper or barrel opening 14 and rotated in relation to the barrel 10, by drive means 19, causes the process material to be extruded forward along the helical extrusion groove 22, through the mixing zones to the helical extrusion grooves 23 and 24 of the forcing and metering barrel sections 11 and 12. The extrusion capacity of the hopper area is approximately one and a half times the extrusion capacity of the discharge metering section 12. This design tends to compress the process material and to thereby keep the extruder "A" full of process material. The helical rotor grooves 22, 23 and 24 have a tapered bottom design, which is deep at the down stream side and shallow at the upstream side of the extruder groove. This design, when viewed in cross-section, is a tightening spiral which "pinches" the process material when the rotor 20 is rotated.

Figure 12:
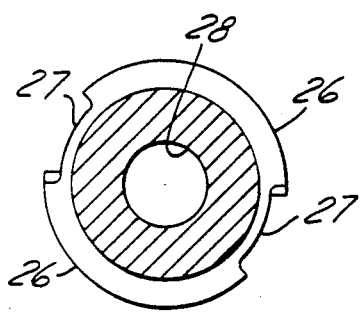
FIG. 12 is a sectional view through the rotor taken on the line 12—12 of FIG. 11 and illustrating the relative heights of the plows.

The rotor to barrel to rotor mixing zones are arranged to cross-shear the process material and thereby blend any temperature stratification developed by the preceding helical rotor grooves 22, 23, or 24. The rotor 40 of the transfer zone starts with a circumferential barrier 41 (FIGS. 8 and 10), which is provided with a clearance 44 (FIG. 1), barrier top to barrel bore 13, adequate to pass fluent material but restrictive to oversize and less fluent materials. To make the division of the process material more effective, multiple dual purpose plows 26 and 27 (FIGS. 11 and 12) are installed at the leading edge of barrier 41 (FIG. 1). The top plow 26 is arranged to direct the fluent top of groove process material downstream to the circumferential barrier 41. The bottom plow 27 is arranged to direct the cold and less fluent process material upstream, exposing it to additional action. Thus the plows 26 and 27 tend to equalize the work exposure of the process material, but more important establishes an un-equal downstream extrusion rate. Extruder action is essentially first in first out, which minimizes the possibility of longitudinal blending. Displacing the material longitudinally, in relation with itself, provides a new parameter which is added to extrusion mixing, longitudinally blending.

The circumferential barrier 41 is followed by a circumferential dam 42 (FIGS. 8 and 10), which directs the extrusion flow, from the rotor circumferential barrier 41 to the barrel extrusion grooves 31 and 32 (FIGS. 4–7) of the barrel member 30 of the transfer zone. The barrel grooves 31 and 32 convey the process material past the rotor dam 42 to the barrel to rotor transfer, where the process material is returned to rotor grooves 43 and the rotor 40. Again, longitudinal displacement is accomplished by providing different extrusion rates to the barrel grooves 31 and 32. As this process is repeated two times, extrusion mixing can reach a new and improved level of quality.

The barrel members 10, 11 and 12 are spliced together as shown in FIG. 2. It shows the removable rings which comprise the barrel member 30 and rotor member 40 of the rotor to barrel to rotor zone. The rotor member 40 is splined to the rotor 20 and the barrel member 30 is secured by press fit to the barrels 10 and 11 and 11 and 12. The sections of the rotor 20 are held together by couplings 50, which are provided with right and left hand threads. Groove 25 is provided which receives an "O" ring 25a to stop any leakage from rotor bore 28.

As shown in FIG. 3, the barrel member 30 of the transfer zone is splined to the rotor 20. Also shown is the spline drive of the coupling 50 which holds the rotor sections together. FIGS. 5–7 are cross-sectional views which shows the un-equal capacity barrel extrusion grooves 31 and 32.

Figure 8:
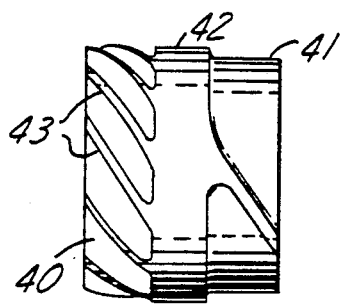
FIG. 8 is a side view of the rotor of the rotor to barrel to rotor zone.

FIG. 8 is a side view of the rotor 40 of the rotor to barrel to rotor zone. The entrance of circumferential cam shaped barrier 41 is undercut to provide restrictive clearance, barrier top barrel bore 13. Rotor dam 42 features normal extruder clearance dam top to barrel bore 13. The multiple grooves 43 are arranged to maximize cross-sectional shearing of the material as it transfers from barrel grooves 31 and 32 to the rotor grooves 43.

Figure 10:
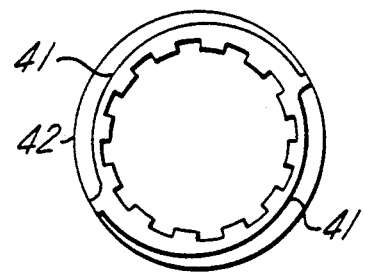
FIG. 10 is the upstream end view of the rotor shown in FIG. 8 and showing the clearance barrier top to barrel bore and the keying arrangement.

FIG. 10 is an upstream end view of the rotor 40 showing the cam shaped clearance barrier top to barrel bore 13 and spline arrangement to develop the required driving torque.

Figure 11:
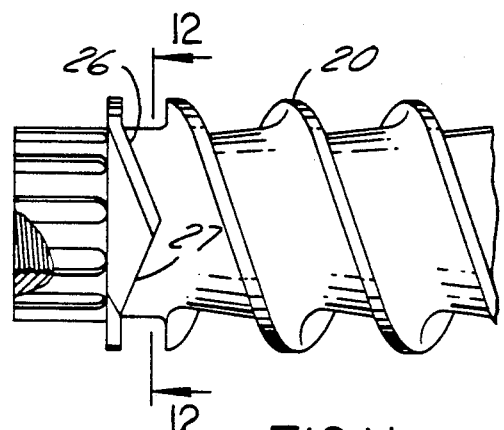
FIG. 11 is a fragmentary elevational view of the downstream end of the rotor.

FIG. 11 is an upstream end elevational view of the rotor sections containing the helical extrusion grooves 22 and 23. It features the multiple dual purpose plows 26 and 27. Plow 26 directs the process material from the top of the extruder groove downstream to the barrier 41, while the plow 27 redirects the process material from the bottom portion of the extruder groove, back upstream exposing it to additional work. The cut-away shows the internal right hand threads 52 used to accommodate coupling 50.

Figure 13:
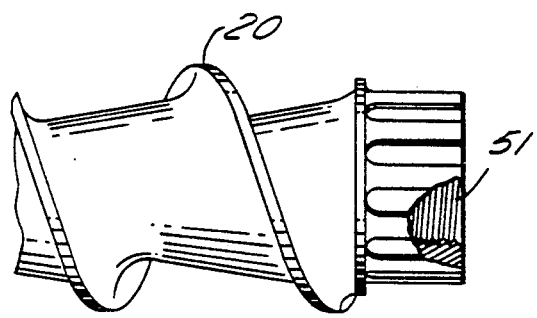
FIG. 13 is an elevational view of the leading end of the rotor, with parts broken away.
Figure 14:
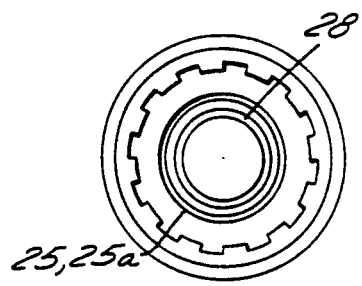
FIG. 14 is an end view of the section of the rotor shown in FIG. 13.
Figure 16:
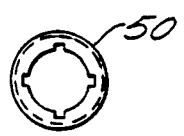
FIG. 16 is an end view of the coupling of FIG. 15 and illustrating a spline.
Figure 15:
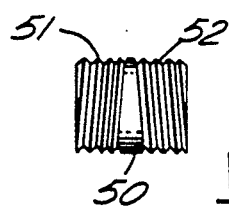
FIG. 15 is an elevational view of a coupling having right and left hand threads.

The leading end elevational view of rotor 20 sections 23 and 24 is shown in FIG. 13. The cut-away shows the internal left hand threads 51 used to accommodate coupling 50 which is provided with right and left hand threads 51 and 52 as shown in FIG. 15.

The coupling 50 is provided with a spline connection adapted for a special wrench used to join the rotor sections.

Each section has an imposed order of mixing, especially designed to accomplished the task at hand, to thereby accomplish the same degree of mixing continuously, to do so with minimum haphazard shearing and to thereby use the power input to best advantage and thereby reduce the unit power required; to minimize un-necessary break down of the polymer; to eliminate the necessity of dwell time; to create an extrusion of all uniformly mixed material of superior quality; and to do so with a low cost extruder which is adaptable to all viscosity materials and their required discharge temperatures.

The extrusion apparatus is provided for the mixing and extrusion of thermo-plastic and thermo-setting materials and the pelletizing of thermo-set materials, in which a rotor member is rotatable within a barrel member. The extrusion apparatus is articulated into three sections including the barrel entrance section, a forcing section and a metering section. Each rotor section is provided with state of the art helical extrusion grooves. The first two sections terminate with a circumferential barrier the lead end of which is provided with dual purpose plows which direct the material at the outer portion of the groove downstream and material at the lower portion of the groove upstream for additional working.

The circumferential barrier is followed by a circumferential groove or grooves which starts deep at the plow entrance and taper to zero depth at their downstream end forcing process material from the rotor to the co-acting barrel member. The co-acting barrel grooves, receiving the material from the rotor, are arranged to have various extrusion rates so as to displace the material longitudinally in relation to itself and thereby achieve longitudinal blending. with essentially all of the material flow in the barrel grooves, it is directed over the rotor barrier to barrel sending grooves which transfer the material from the barrel back to the rotor receiving geometry.

Rotor and barrel members of each section and mixing zones members are separate and interchangeable so that the sections and zones can be adjusted to accommodate existing compounds and compounds yet to be developed. Grinding thermo-set materials, such as scrap tires to pelletized rubber for reclaiming can be accomplished with reasonable adjustments.

In a novel portion of the invention, in brief, in the mixing stage, first the dual plows direct the warmed material downstream while the less worked material is plowed back upstream for additional work. The rotor sending stage is provided with a circumferential decreasing in depth extrusion groove or grooves to force the selected process material into the barrel grooves and downstream. The receiving barrel grooves, having unequal extrusion capacity displace the process material longitudinally in relation to itself, and transport the process material to the downstream end of the barrel grooves where it is transferred back to the rotor. Or in brief, advance the better processed material, cross-shear it as it is transferred to the barrel grooves, longitudinally displace it in relation to itself as it transverses the barrel grooves, and cross-shear the longitudinally displaced material as it reenters the rotor. This design eliminates the cross-shearing of already cross-sheared material as is performed by my U.S. Pat. Nos. 2,744,287 and 4,075.719.

What I claim is:

1. An extrusion apparatus for mixing and extruding thermo-plastic and thermo-setting materials and for the pelletizing of thermo-set materials comprising, a rotor member, a stationary barrel member providing a bore in which said rotor member is adapted to be rotated, means for rotating said rotor member within said barrel member, said barrel and rotor members having multiple sections including a barrel entrance section having an opening, a forcing section and a metering section; said rotor member extending through said barrel member and being provided with a helical extrusion grooves; said barrel entrance section, forcing section and metering section each having a leading end and a trailing end; means connecting the trailing end of said barrel entrance to the leading end of said forcing section; and means connecting the trailing end of said forcing section to the leading end of said metering section; said connecting means including ring members, both rotor and barrel, which have extrusion geometry which co-acts to perform the various mixing and blending functions required by the process material.

2. The extrusion apparatus defined in claim 1, wherein said rotor and barrel connecting ring members having mixing geometry which cross shears the process material as it transfers rotor to barrel to rotor.

3. The extrusion apparatus defined in claim 1, wherein said barrel connecting ring member is provided with extrusion grooves which displace the process material longitudinally in relation to itself.

4. The extrusion apparatus defined in claim 1, wherein said rotor connecting ring member is preceded by a circumferential barrier provided with dual purpose plows to direct the fluent material downstream and the oversize less fluent material upstream for additional working.

5. The extrusion apparatus defined in claim 4, wherein said rotor connecting ring member receives said fluent material from said upstream plow and directs it to multiple barrel grooves.

6. The extrusion apparatus defined in claim 5, wherein said multiple barrel grooves have different extrusion capacities which in addition to rotor action displaces the process material longitudinally in relation to itself.

7. The extrusion apparatus defined in claim 1, wherein each of said barrel entrance section, forcing section and metering section is provided with a circumferential barrier and a rotor to barrel to rotor transfer zone member.

8. The extrusion apparatus defined in claim 7, wherein each circumferential barrier is provided with a clearance, barrier top to barrel bore, designed to pass fluent material and retarding the over-size and less fluent material 9. The extrusion apparatus defined in claim 8, wherein the leading edge of each circumferential barrier is provided with multiple dual purpose plows to direct the fluent material downstream and the over-size and less fluent material upstream for additional working.

10. The extrusion apparatus defined in claim 9, wherein each circumferential barrier communicates with the co-acting reviewing geometry of the barrel member and effects the transfer of the fluent material to the barrel grooves.

11. The extrusion apparatus defined in claim 10, wherein said barrel grooves, co-acting with the smooth surface of the rotor, are provided with various extrusion rates to displace the material longitudinally and thereby achieve longitudinal blending.

12. The extrusion apparatus defined in claim 11, wherein the barrel extrusion grooves discharge into the barrel sending grooves which transfer the material from the barrel member back into the rotor receiving grooves.

13. The extrusion apparatus as defined in claim 9, wherein said connecting ring members are arranged as inner and outer ring members and are removable from said apparatus, with said inner ring member being splined to said rotor member and said outer ring member being secured to said barrel member.

14. The extrusion apparatus defined in claim 9, wherein the sections of said rotor member are connected together by threaded couplings which are provided with right and left hand threads.

15. The extrusion apparatus defined in claim 8, wherein multiple dual purpose top and bottom plows are provided on the leading edge of said circumferential barrer; said top plow being arranged to direct the fluent top of groove process material downstream to said circumferential barrier; and said bottom plow being arranged to direct the cold and less fluent process material up stream exposing it to additional action.

16. The extrusion apparatus defined in claim 15, wherein a circumferential cam is provided on the ring member following said circumferential barrier, said circumferential dam directing the extrusion flow of the process material from said circumferential barrier to said barrel extrusion grooves of the outer ring member whereby said barrel extrusion grooves convey the process material pass said dam to the barrel to rotor transfer, where the process material is returned the rotor grooves and the rotor.

17. The extrusion apparatus defined in claim 16, wherein each coupling is provided with a spline formation to accommodate a wrench used to join the sections of the rotor.

18. The extrusion apparatus defined in claim 7, wherein the rotor member and the barrel member of each of the barrel entrance section, forcing section and metering section and the transfer zone members are separate and interchangeable so that the sections and zone members can be adjusted to accommodate various compounds.

* * * * *